United States Patent [19]

Durand

[11] 4,058,014

[45] Nov. 15, 1977

[54] MAXIMUM TEMPERATURE RANGE INDICATOR

[75] Inventor: James C. Durand, Peoria, Ill.

[73] Assignee: Caterpillar Tractor Co., Peoria, Ill.

[21] Appl. No.: 705,845

[22] Filed: July 16, 1976

[51] Int. Cl.² .................. G01K 11/00; G01R 27/00; H01H 37/76
[52] U.S. Cl. .................. 73/358; 324/65 R; 337/403; 338/28; 340/227 R; 340/227.1
[58] Field of Search ........... 116/114 V, 114 Z, 114 Y, 116/114 AE; 73/358, 363.5, 362 AR; 338/28, 30, 31, 92, 93, 96, 49, 114, 115, 99; 324/100, 65 R; 340/227.1; 200/61.19; 337/409, 406, 412, 403, 416

[56] References Cited

U.S. PATENT DOCUMENTS

| 1,148,931 | 8/1915 | Rosenthal | 337/406 |
|---|---|---|---|
| 1,685,136 | 9/1928 | Montgomery | 337/409 |
| 2,750,482 | 6/1956 | Peterson | 340/227.1 X |
| 2,765,457 | 10/1956 | Stang | 340/227.1 X |
| 3,044,296 | 7/1962 | Boddy | 73/363.5 X |
| 3,942,467 | 3/1976 | Witonsky | 116/114 V |

Primary Examiner—Daniel M. Yasich
Attorney, Agent, or Firm—Phillips, Moore, Weissenberger, Lempio & Majestic

[57] ABSTRACT

To detect and record the highest operating temperature range which occurs in an engine, transmission, implement hydraulic system or the like during an extended period of time, an indicator device is adapted to be mounted in thermal contact with a liquid coolant flow, lubricant flow or the like of the apparatus. The device has a housing containing a plurality of electrical resistor segments connected in series between an external electrode and the housing. A plurality of temperature-sensitive switches are arranged to short out successive ones of the resistor segments upon the occurrence of successively higher predetermined temperatures. The maximum temperature range which has been reached over an extended period of operating time may then be determined by using an ohmmeter to measure the electrical resistance between the electrode and the housing since the shorting out of successive ones of the resistor segments, upon the occurrence of successively higher temperature ranges, progressively reduces the electrical resistance in the circuit. The temperature-sensitive switches may be a series of springs each initially held in a compressed state by a body of wax wherein the spring expands to short out the associated one of the resistor segments upon melting of the wax and wherein the wax bodies associated with successive ones of the springs melt at progressively higher temperatures.

9 Claims, 4 Drawing Figures

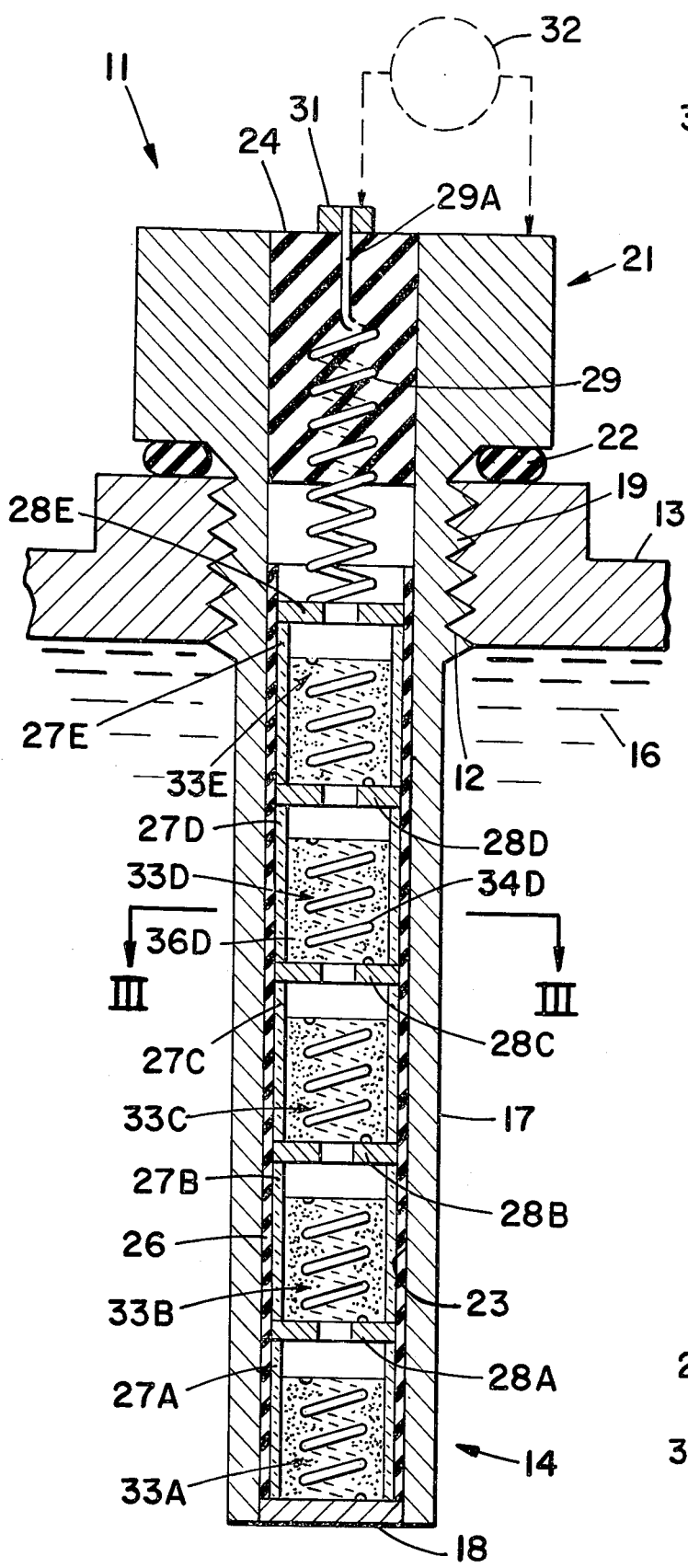
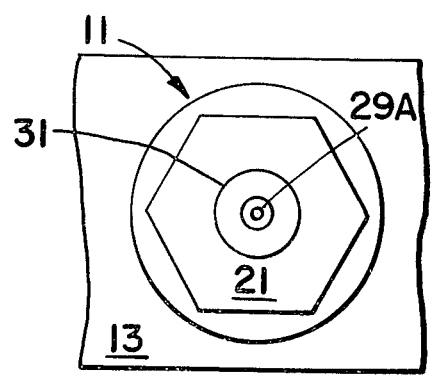
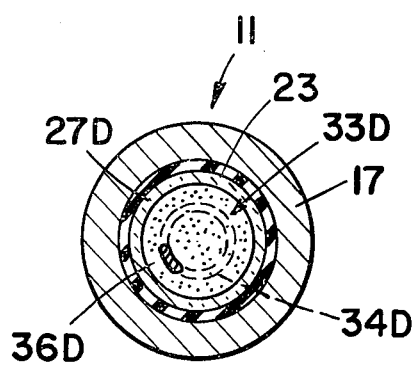
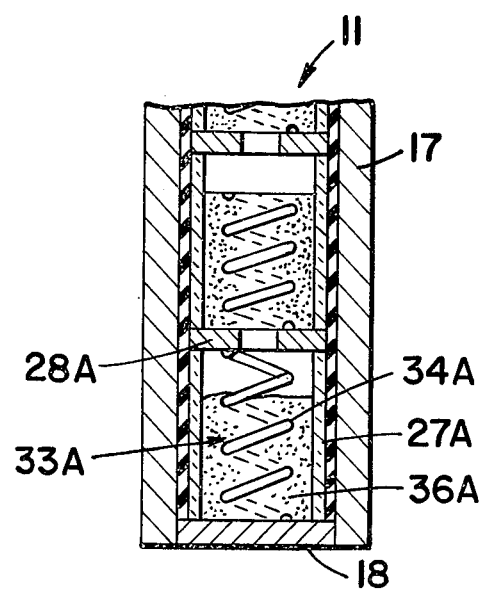
FIG _ 1
FIG _ 2
FIG _ 3
FIG _ 4

MAXIMUM TEMPERATURE RANGE INDICATOR

BACKGROUND OF THE INVENTION

This invention relates to temperature-sensing and indicating means and more particularly to an electromechanical device for storing an indication of the maximum temperature range which has occurred in the surrounding environment during a period of time.

Powered vehicles and other systems having an internal combustion engine, hydraulically operated implements or any of various other components which may operate at elevated temperatures, are often provided with some form of temperatureindicator which either displays a reading of current operating temperature or else lights a warning lamp if operating temperature should exceed a predetermined maximum value. These instruments are primarily for the purpose of altering the operator to a possible malfunction or to a need for maintenance. Such instruments are not very adaptable to determining the maximum operating temperature which may occur in an engine or other vehicle component during a prolonged period of operation such as a period of several weeks or months. As a practical matter, the operator does not continually watch the temperature indicator nor make extensive detailed recordings of temperature readings.

Information on the maximum operating temperatures which may be encountered in an engine, hydraulic component or the like of a vehicle over a long period of time may be useful to the operator or to maintenance personnel and may also by highly important to design engineers. For example, when a particular model of engine is designed, it is provided with a cooling system typically including a radiator, a fan, a cooling pump and the like and these cooling system components are a significant factor in determining the bulk, weight and ultimately the cost of the engine. The size or capacity of the cooling system is initially based on an estimate of what may be required in the way of cooling capacity in the typical usages to which the engine model will eventually be put. It is possible that this initial estimate may be inaccurate. If the engine has been provided with insufficient cooling capacity, that fact soon becomes evident to users of the engine and the information soon reaches the manufacturer who may then modify the cooling system to provide such additional capacity as is needed. On the other hand, if an engine has been provided with too much cooling capacity for the uses to which it is typically put, that information may not become evident for a long period if at all.

The disadvantages of an engine or other vehicle component with less than adequate cooling capacity are evident. It is less obvious that there are disadvantages to manufacturing a given model of engine or the like with more cooling capacity than is needed for the typical usage of the engine. To the extent that excess cooling capacity has been provided, there is excess weight, bulk and complication in an engine and fuel consumption is adversely affected. Similar considerations apply to other vehicle components having cooling means. The presence of an unnecessarily large cooling system ultimately means that the costs of both manufacture and operation of the engine or other component are unnecessarily high. A compact, durable and economical device which can be installed on a representative sampling of engines or other components for an extended period of time and which will detect and store an indication of the maximum temperature range which has occurred during a period of time may enable manufacturers to learn more quickly of a situation where the cooling or lubricating system of a particular vehicle component has more capacity than is really required for the typical usages to which the component is being put.

A highly advantageous form of instrument for this purpose is disclosed in applicant's copending application Ser. No. 705,844, filed concurrently with the present application and entitled "MAXIMUM TEMPERATURE-INDICATOR". This copending application discloses a wholly mechanical maximum temperature indicator which may be installed on a vehicle for a long period of time and which provides a visual indication of the maximum temperature which has occurred during that period of time.

SUMMARY OF THE INVENTION

This invention is a compact, durable device which may be installed on a vehicle component such as an engine, a hydraulic system or the like for a prolonged period of time and which includes a circuit wherein the electrical resistance at any given time is indicative of the maximum temperature range which has occurred within the component during the preceding period of operation.

A maximum temperature range indicator in accordance with the present invention may have a plurality of electrical resistor segments connected in series relationship to electrode means which enable the electrical resistance through the series of resistor segments to be measured with an ohm-meter or the like. A plurality of temperature-sensitive switch means are provided each being associated with an individual one of the resistor segments. Each switch means is adapted to short out the associated resistor segment upon the occurrence of a predetermined temperature which predetermined temperature is a different temperature value for each of the temperature-sensitive switch means. Thus if the device is disposed in thermal contact with the coolant, lubricant or some other similar component of a vehicle for an extended period of time, a measurement of the resistance of the series of resistor segments is indicative of the maximum temperature range which has occurred during that period of time.

In a preferred form, the temperature-sensitive switches may be a series of springs which are initially held in a stressed condition by an associated body of meltable wax or the like, the wax body at each such spring being meltable at a different predetermined temperature. Upon melting of the wax associated with a particular switch, the spring is released to short out the associated one of the resistor segments.

Accordingly it is an object of this invention to provide a compact, durable and economical device for storing an electrical resistance value indicative of the maximum temperature range which has occurred in a vehicle component during an extended period of time.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 is an axial section view of a maximum temperature range indicator device shown mounted on an engine component, the device being shown in FIG. 1 at a scale of approximately twice the size of a typical example in order to better illustrate internal structure, FIG. 2 is a top view of the device of FIG. 1 shown on a smaller scale, FIG. 3 is a cross-sectional view taken along line III—III of FIG. 1, and FIG. 4 is an axial section view of the bottom portion of the device of FIG. 1 illustrating typical changes which occur in the presence of an elevated temperature.

DESCRIPTION OF A PREFERRED EMBODIMENT

Referring now to the drawing and more particularly to FIGS. 1 and 2 in conjunction, a maximum temperature range indicator 11 is shown mounted in a typical operating position on an engine wherein the indicator is engaged in a threaded opening 12 in the radiator wall 13 of an engine with an inner end 14 of the indicator extending into the volume of engine coolant 16 within the radiator.

Indicator 11 has a tubular housing 17, closed at the inner end 14 by a fluid-tight end disc 18, and has a threaded portion 19 that engages in opening 12. The outer end 21 of the housing 17 is of greater diameter than the other portions and has a hexagonal cross section in this example to facilitate threading of the indicator device into opening 12. Outer end 21 also compresses an annular resilient seal 22 against wall 13 to inhibit fluid leakage through threaded opening 12.

In many vehicles, a suitable threaded opening 12 for receiving the indicator 11 may already be present for various purposes but if it is not, such an opening is readily provided during manufacture of the engines or afterwards. Further, while the indicator 11 is here shown as being engaged in an opening of a radiator for purposes of example, it will be apparent that it may also be mounted on the vehicle at various other locations, such as in coolant flow lines, lubricant flow lines, at the coolant or lubricant pump or the engine oil pan or at other locations which undergo temperature fluctuations corresponding to fluctuations of the operating temperature of the engine or some other vehicle component.

Housing 17 has an axial passage 23 which is closed at inner end 14 by the end disc 18 as previously described. The outer end 21 of the housing is closed by a cylindrical plug 24. End disc 18, which also constitutes a switch contact as will hereinafter be described, is formed of an electrically conductive material. Housing 17 is also formed of conductive material but plug 24 is formed of electrical insulator material. Passage 23 of housing 17 is lined with electrical insulator material which in the present example is a sleeve 26 inserted into the passage but which may be replaced by a coating of hardenable liquid insulator applied to the inner wall of the housing if desired.

A plurality of electrical resistor segments 27A to 27E are disposed within passage 23 of the housing 17 and in this example are of cylindrical form and are disposed in coaxial relationship within the passage 23 and insulator sleeve 26 in axially spaced relationship with each other. One of a plurality of annular conductive electrical contacts 28A to 28D is disposed coaxially between each adjacent pair of the resistor segments 27 and an additional such contact 28E is similarly disposed at the end of the outermost resistor segment 27E facing insulator plug 24. Accordingly the resistor segments 27 are in effect connected in series relationship with one end of the series of resistor segments being electrically grounded to end disc 18 and thus to housing 17. The other end of the series of resistor segments 27 is electrically defined by the outermost contact 28E.

To provide an electrode means by which the electrical resistance of the series of resistor segments 27 may be measured for purposes to be more fully described hereinafter, the outer portion of an electrically conductive compression spring 29 is embedded within the insulative plug 24 while the inner portion of the spring extends inward from the plug to bear against the outermost contact 28E and to make electrical contact therewith. The opposite end portion 29A of the spring extends a short distance from the outer end of plug 24 and electrically connects with a contact button 31 thereat. Thus by temporarily connecting one terminal of an ohmmeter 32 to the outer portion 21 of the housing while connecting the other ohmmeter terminal to electrode button 31, the resistance of the circuit defined by the resistor segments 27E may be measured.

A plurality of temperature-sensitive switch means 33A to 33E are provided within housing 17 to short out or bridge successive ones of the resistor segments 27 as engine coolant 16 reaches progressively higher predetermined temperatures.

Each of the temperature-sensitive switch means 33 may have an essentially similar construction except for one difference which will hereinafter be pointed out. Considering switch means 33D as a representative example and with reference to FIGS. 1 and 3 in conjunction, each such switch means in this example includes an electrically conductive compression spring 34D. The spring 34D is initially held in a state of axial compression by being embedded in a cylindrical body of wax 36D which is disposed coaxially within the associated one of the resistor segments 27D in this example. The wax body 36D and embedded compressed spring are of less axial length than the associated resistor segment 27B so that the spring 34D contained within the wax is initially unable to provide a low resistance electrically conductive path between the adjacent ones of the contacts 28, which are contacts 28C and 28D in this example. If the body of wax 36D melts and liquefies, the associated spring 34D is then released and may extend axially to establish a low-resistance conductive path between the two adjacent contacts 28C and 28D.

The above-described elements of the temperature-sensitive switch means may readily be manufactured by disposing the springs 34 in a mold having the desired shape of the wax body 36D, then filling the mold with wax which has been liquefied by being heated and by then compressing the spring by forcibly applying a cover to the mold and by then allowing the wax to harden by cooling.

Each of the other temperature-sensitive switch means 33 may have a similar construction with the important difference that the wax bodies 36A to 36E of the individual ones of such means are formed of wax having different predetermined melting temperatures.

The resistance values of each resistor segment 27A to 27E and the melting temperatures of the associated wax bodies 36A to 36E may differ in different specific indicator devices 11 according to the typical operating temperature ranges of the particular model of engine with which the device is to be employed. In a typical specific indicator device 11, described for purposes of example only, each resistor segment 27 may have a resistance value of 1000 ohms so that initially ohmmeter 32 will indicate a total resistance of about 5000 ohms between electrode button 31 and housing 21. Wax body 33A may have a composition which causes the body to melt and liquefy at a temperature of 230° F. (110° C.) which temperature value is near the top limit of the anticipated operating range of temperatures of the engine on which the indicator device 11 is to be used. The additional wax bodies 26B through 26E may have compositions which provide for melting at temperatures of 235° F. (113° C.), 240° F. (116° C.), 245° F. (118° C.) and 250° F. (121° C.) respectively, the last-mentioned temperature being substantially above the anticipated maximum operating temperature of the engine model.

In operation, with the indicator device 11 mounted in a vehicle as described above, heat from coolant 16 is transmitted through housing 17, insulator sleeve 26, resistor segments 27 and contacts 28 to the several wax bodies 26. Each of the wax bodies 36 will melt and release the associated spring 34 upon the occurrence of a different predetermined engine coolant temperature. Upon such release of a spring 34, the associated one of the resistor segments 27 is bridged or shorted out by a relatively low resistance conductive path and the overall resistance between electrode 31 and housing 21 is thereby reduced. FIG. 4, for example, depicts the condition where wax body 36A, which is the body which melts at the lowest temperature in this example, has melted and released the associated spring 34A. As spring 34A then provides a low resistance conductive path between end disc 18 and contact 28A, the associated resistance segment 27A has in effect been shorted out of the series of resistor segments 27 and the overall electrical resistance of the series of resistor segments has been reduced by an incremental step.

If higher temperatures have been encountered during the period of use of the indicator device 11, additional ones of the springs 34 will have been released to decrease the overall resistance of the circuit by still additional incremental steps, the number of such springs which have been released being dependent on the maximum operating temperature which has occurred within the engine.

It should be observed that upon release of a spring 34 as depicted in FIG. 4, the associated electrical resistor segment 27 remains shorted out even though the adjacent wax body 36 may resolidify due to subsequent cooling of the engine.

Accordingly, after a period of use, the maximum temperature range which has occurred within the engine may be determined by applying the ohmmeter 32 of FIG. 1 to the device as previously described and by noting the resistance between electrode 31 and housing 21. Since the several wax bodies 36D melt at predetermined known temperatures, the maximum temperature range which has occurred may readily be computed from the reading of the ohmmeter or, if desired, the ohmmeter may be calibrated in advance to read directly in temperatue ranges.

Thus in an example of the invention having the specific resistance values and wax body melting temperatures given above, an ohmmeter 32 reading of 5000 ohms indicates that the temperature which has occurred in the engine has not exceeded 230° F. (110° C.). A reading of 4000 ohms indicates that the maximum temperature which has occurred is within the range 230° F. (110° C.) to 235° F. (113° C.) while a reading of 3000 ohms indicates that the maximum temperature has been within the range 235° F. (113° C.) to 240° F. (116° C.) and a reading of 2000 ohms indicates that the maximum temperature has been within the range 240° F. (116° C.) to 245° F. (118° C.). A reading of 1000 ohms indicates that the maximum temperature has been in the range of 245° F. (118° C.) to 250° F. (121° C.) while a reading substantially below 1000 ohms indicates that the maximum engine temperature has exceeded 250° F. (121° C.). It should be understood that these specific values are given for purposes of example only and may be varied as desired to accommodate to engines of different operating range.

While the invention has been disclosed with respect to a specific preferred embodiment, it will be apparent that many variations are possible and it is not intended to limit the invention except as defined in the following claims.

I claim:

1. A maximum temperature range indicator comprising:
    a plurality of spaced-apart electrical contacts,
    a plurality of electrical resistor segments connecting said contacts together in electrical series relationship to establish high-resistance conductive paths between successive pairs of said contacts, and
    a plurality of temperature-responsive electrical switches each being maintained operatively spaced between a different pair of said contacts, each of said switches coacting with a temperature-sensitive means for closing a low-resistance conductive path between an associated pair of said contacts upon occurrence of a predetermined temperature, the predetermined temperature to which each of said temperature-sensitive means responds being a different predetermined temperature whereby the maximum temperature range experienced by said indicator over a period of time may be determined by measuring the electrical resistance through the electrical circuit formed by said pluralities of contacts and resistor segments and switches.

2. The combination of claim 1 wherein said temperature-sensitive means at each of said switches comprises a body of initially solid material which melts at a predetermined temperature to initiate establishment of said low-resistance conductive path and wherein each of said switches further comprises a resilient element initially held in a state of stress by said body of solid material and which is released from said state of stress by melting of said body of solid material, wherein said resilient element is a helical electrically conductive spring at least partially embedded in said body of solid material and initially held in a state of axial compression by said body of material, said spring being positioned to expand axially upon melting of said body of material to establish said low-resistance conductive path between said associated pair of said contacts.

3. The combination of claim 2 wherein said body of material in which said spring is at least partially embedded is comprised of wax having a known predetermined melting temperature the predetermined melting temperature of the wax being different at each of said plurality of switches.

4. The combination of claim 1 wherein each of said resistor segments has a known electrical resistance value.

5. A maximum temperature range indicator comprising:
    a plurality of spaced-apart electrical contacts, a plurality of electrical resistor segments connecting said contacts together in electrical series relationship to establish high-resistance conductive paths between successive pairs of said contacts, a plurality of temperature-responsive electrical switches each being maintained operatively spaced between a different pair of said contacts, each of said switches coacting with a temperature-sensitive means for closing a low-resistance conductive path between an associated pair of said contacts upon occurrence of a predetermined temperature, the predetermined temperature to which each of said temperature-sensitive means responds being a different predetermined temperature, means for supporting said temperature-sensitive means of said plurality of switches in heat-exchanging relationship with an internal fluid of a component of a vehicle and means forming a pair of electrically insulated electrodes to which an ohmmeter may be at least temporarily applied, one of said pair of electrodes being connected to the first of said contacts and the other of said electrodes being connected to the final one of said contacts whereby the maximum temperature range experienced by said indicator over a period of time may be determined by measuring the electrical resistance through the electrical circuit formed by said pluralities of contacts and resistor segments and switches.

6. A maximum temperature range indicator comprising:

a plurality of spaced-apart electrical contacts, a plurality of electrical resistor segments connecting said contacts together in electrical series relationship to establish high-resistance conductive paths between successive pairs of said contacts, a plurality of temperature-responsive electrical switches each being maintained operatively spaced between a different pair of said contacts, each of said switches coacting with a temperature-sensitive means for closing a low-resistance conductive path between an associated pair of said contacts upon occurrence of a predetermined temperature to which each of said temperature-sensitive means responds being a different predetermined temperature, a tubular housing having a passage therein, said resistor segments being of annular configuration and being disposed in said passage in coaxial, axially spaced-apart relationship with each other, said contacts being annular and being disposed adjacent the ends of said resistor segments to define a series of chambers each of which is within a separate one of said resistor segments, each of said temperature-responsive switches being disposed in a separate one of said chambers, whereby the maximum temperature range experienced by said indicator over a period of time may be determined by measuring the electrical resistance through the electrical circuit formed by said pluralities of contacts and resistor segments and switches.

7. The combination of claim 6 wherein said housing has means for attachment to a fluid-retaining wall of a vehicle component with an inner end portion of said housing being inside said wall and an outer end portion of said housing being accessible from outside said wall, further comprising means electrically insulating a first of said contacts and all but the final one of said contacts from said housing, an electrically insulative element disposed in said passage at said outer end portion of said housing, and an electrode element extending into said passage through said insulative element and being electrically connected to said first contact.

8. The combination of claim 7 wherein said electrode element is an electrically conductive spring abutted against said first contact and exerting pressure thereon.

9. The combination of claim 6 wherein each of said temperature-responsive switches comprises a body of wax meltable at a known temperature and disposed in one of said chambers, and an electrically conductive spring at least partially embedded in said body of wax and held in a state of compression thereby.

* * * * *